US010010978B2

(12) United States Patent
Haeufgloeckner

(10) Patent No.: US 10,010,978 B2
(45) Date of Patent: Jul. 3, 2018

(54) DETERMINATION OF A QUALITY OF AN ALUMINUM WELD

(71) Applicant: Robert Bosch GmbH, Stuttgart (DE)

(72) Inventor: Juergen Haeufgloeckner, Schneeberg (DE)

(73) Assignee: Robert Bosch GmbH, Stuttgart (DE)

( * ) Notice: Subject to any disclaimer, the term of this patent is extended or adjusted under 35 U.S.C. 154(b) by 1084 days.

(21) Appl. No.: 13/904,718

(22) Filed: May 29, 2013

(65) Prior Publication Data

US 2013/0334177 A1 Dec. 19, 2013

(30) Foreign Application Priority Data

May 30, 2012 (DE) .................. 10 2012 010 716

(51) Int. Cl.
| | | |
|---|---|---|
| *B23K 11/10* | (2006.01) | |
| *B23K 31/12* | (2006.01) | |
| *B23K 11/11* | (2006.01) | |

(52) U.S. Cl.
CPC ............ *B23K 31/125* (2013.01); *B23K 11/10* (2013.01); *B23K 11/115* (2013.01)

(58) Field of Classification Search
CPC ....... B23K 31/125; B23K 11/10; B23K 11/11; B23K 11/115
USPC ..... 219/86.7, 91.1, 91.2, 86.33, 86.25, 86.1, 219/78.01
See application file for complete search history.

(56) References Cited

U.S. PATENT DOCUMENTS

| | | | | |
|---|---|---|---|---|
| 4,419,558 A | * | 12/1983 | Stiebel ................. | B23K 11/255 219/109 |
| 2005/0045597 A1 | * | 3/2005 | Wang ..................... | B23K 11/11 219/110 |
| 2007/0131655 A1 | * | 6/2007 | Spinella ............... | B23K 11/252 219/61.4 |
| 2007/0175869 A1 | * | 8/2007 | Auger .................. | B23K 11/255 219/110 |
| 2007/0295697 A1 | * | 12/2007 | Braun .................. | B23K 11/314 219/86.33 |
| 2012/0118861 A1 | * | 5/2012 | Haeufgloeckner ..... | B23K 11/11 219/91.1 |

FOREIGN PATENT DOCUMENTS

| | | |
|---|---|---|
| DE | 100 60 055 A1 | 6/2002 |
| DE | 10 2008 005 113 B4 | 1/2008 |

OTHER PUBLICATIONS

German Patent and Trademark Office Search Report corresponding to DE 10 2012 010 716.1, dated Mar. 11, 2013 (German language document) (9 pages).

* cited by examiner

*Primary Examiner* — Tu B Hoang
*Assistant Examiner* — Alba Rosario-Aponte
(74) *Attorney, Agent, or Firm* — Maginot, Moore & Beck LLP

(57) ABSTRACT

A method for determining a quality of at least one aluminum weld comprises detecting a force exerted on a workpiece by at least one electrode, and determining at least one factor characterizing the quality on the basis of a comparison of the detected force with at least one reference value. An aluminum welding method, a welding device set up for a corresponding operation, a welding controller and a computer program are likewise the subject matter of the disclosure.

11 Claims, 4 Drawing Sheets

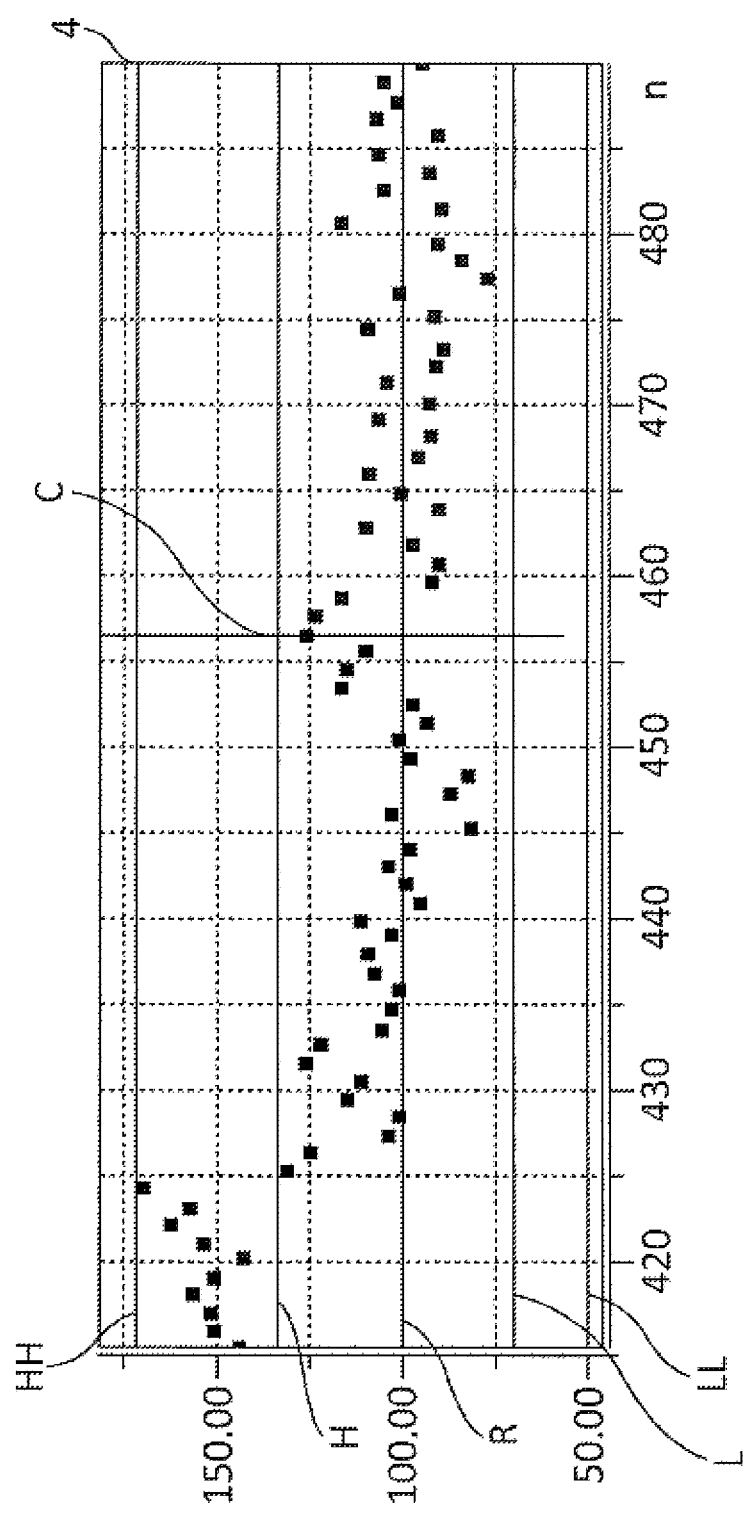

DETERMINATION OF A QUALITY OF AN ALUMINUM WELD

This application claims priority under 35 U.S.C. § 119 to patent application no. DE 10 2012 010 716.1, filed on May 30, 2012 in Germany, the disclosure of which is incorporated herein by reference in its entirety.

The present disclosure relates to a method for determining a quality of at least one aluminum weld, an aluminum welding method, a welding device set up for a corresponding operation, a welding controller and a computer program.

BACKGROUND

Aluminum is gaining in importance increasingly as material in coachbuilding. In particular, top class vehicles and sports cars are already in part produced entirely from aluminum. Despite higher costs, aluminum can compete with steel in certain areas of use. Bodies fabricated completely from aluminum can already be mass produced, the methods used for the production of aluminum components and the joining methods for connecting the individual components not, as a rule, requiring more time than is the case for steel parts. Particularly in the case of the high recycling rates to be expected on the basis of the costs of aluminum, the economic balance is also extremely advantageous in the case of aluminum bodies. The energy-intensive production can already be counterbalanced after a short period of use owing to the reductions in consumption and emission which are to be attained.

When aluminum is used in coachbuilding, however, there is at present no possibility for online monitoring of the quality of the welded joints produced, in particular of spot welds. To date, this has had to be safeguarded by a destructive sampling inspection. This procedure is expensive and time-consuming, and is always attended by a certain potential error because of the possibility of nonrepresentative samples.

It follows that there is a need for appropriate improvements in the welding of aluminum, which permit reliable statements relating to the welding quality.

SUMMARY

According to the disclosure, there are proposed a method for determining a quality of at least one aluminum weld, an aluminum welding method, a welding device set up for a corresponding operation, a welding controller and a computer program having the features described herein.

In particular, the method improves spot welding of aluminum even for mass production of motor vehicles. According to the disclosure, it is possible to monitor the quality of a weld or a plurality of welds, for example of each spot weld during spot welding, and, if appropriate, to introduce a corresponding reaction to the monitoring result. It is hereby possible to ensure a production process with uniform quality.

Here, an "aluminum weld" may be understood within the framework of this application both as a welded joint that has been produced, for example a spot weld, and as a weld program or a welding sequence. In particular, the method can be used for spot welds. Here, the technical process may require the heat quantity for an individual spot weld to be delivered in sequential current blocks. Consequently, by way of example, welding can comprise different power blocks, each individual block possibly being separately programmable in a weld program both with reference to time duration and with reference to its output. The programming of the outputs depends on a respectively active control operating mode. For example, here there can be a phase gating control (PHA) or a constant current regulation (KSR). Idle times can be programmed between the blocks. Weld programs which can be defined or retrieved by means of an appropriate welding controller comprise parameters which are required for a definition of a weld. Finally, the term "welding sequence" is intended to denote the sequential production of a plurality of welded joints, for example for an aluminum body.

According to the disclosure, a force exerted on a workpiece by at least one electrode is detected. The method is therefore particularly suitable for electrode and/or arc welding. Here, during the production of a welded joint, for example a spot weld, or during the execution of a weld program, it is possible in this case to determine the time profile of a force signal which is supplied by an appropriate sensor at an electrode holder (denoted below as "weld force profile"), and to record it, for example in the form of a weld force curve.

A monitoring function can be passed through at the end of a parametrized welding sequence during the welding, that is to say, for example, after a period during which there has been a constant current regulation. Within the scope of the monitoring function, the weld force profile is compared with a previously stored reference force profile which, for example, corresponds to optimum welding and/or welding with a verified or minimum required quality. It is also possible to pass through a plurality of such monitoring functions within a welding sequence. A reference force profile can be recorded once or as often as desired. At least two different monitoring variables can be calculated in this comparison as factors characterizing the welding quality. Considered per se, each of these variables can be used to determine a quality of an aluminum weld.

A first factor, denoted below as force quality factor, FQF, reproduces the welding quality and correlates with the spot diameter of a spot weld produced. A second factor, denoted below as process stability factor, PSF, reproduces the stability of the production process. Force quality factor and process stability factor are explained in more detail below.

The force quality, and thus the force quality factor, results from the exact analysis of the weld force profile as illustrated, for example, in FIG. 2, which is explained below. The force quality factor can be calculated here by using salient corner points and trends of the weld force profile, for example of an explained weld force curve, which permit a statement relating to the welding quality (denoted below as features). In particular, one or more gradients, one or more maxima or minima and/or one or more surface areas of corresponding weld force curves or curve regions can be used here as features.

Exemplary features are specified and explained in the following table. Reference may be made to FIG. 2 for a graphical illustration.

| Feature | Formula symbol | Explanation |
|---|---|---|
| Maximum force | $F_{max}$ | Maximum measured force rise, for example referred to the respective reference force |
| End force | $F_{end}$ | Measured force at the end of the weld time |
| Force difference | $\Delta F$ | Difference between maximum force and end force determined from the relative force change |

| Feature | Formula symbol | Explanation |
|---|---|---|
| Area | $A_f$ | Area under the force curve |
| Centroid x | $x_s$ | Surface centroid in direction of the weld time |
| Centroid y | $y_s$ | Surface centroid in direction of the force rise |
| 1st mean gradient | $dF_1$ | Mean gradient in the interval $[t_{start}, 2/3_{tmax}]$ |
| 2nd mean gradient | $dF_2$ | Mean gradient in the interval $[2/3_{tmax}, t_{max}]$ |
| 3rd mean gradient | $dF_3$ | Mean gradient in the interval $[t_{max}, t_{end}]$ |
| Maximum gradient | $dF_{max}$ | Maximum gradient up to the force maximum |

The specified features are preferably determined by a comparison (including a partial one) between the weld force profile and the reference force profile. The ratio of these is taken and used to derive the force quality factor FQF with the aid of a mathematical computational rule. The respectively used computational rule is prescribed by the person skilled in the art in this case in accordance with the respective welding task, taking the hardware involved into consideration. By way of example, it can comprise addition, subtraction, integration and division steps and/or the calculation of (in particular, weighted) mean values, centroids and/or averages.

The force quality factor can be defined in this case as a dimensionless variable which is, for example, calculated and normalized by an appropriate computer program taking account of the technical conditions of the welding apparatus used, for example by a monitoring firmware of a welding controller. The force quality factor can describe a theoretically calculated quality of a spot weld, specifically irrespective of whether this quality has been achieved without or with a compensating control intervention.

The maximum value for the force quality factor can, for example, be fixed at the value 400 in a corresponding computer program. High values for the force quality factor (for example greater than 100) in this case characterize, on the basis of the calculation, spot welds with an adequate and good lens diameter which corresponds at least to one originally learned diameter. Low values for the force quality factor (a minimum value being, for example, zero) characterize an unsatisfactory spot diameter, or even a nonattached spot weld, if appropriate despite a control intervention. The calculation of the value for the force quality factor can in this case be based on a computational rule which takes account of the technical conditions of the welding apparatus used and is, for example, stored in the firmware of a welding controller or an appropriately designed ALR (aluminum regulator). Such an aluminum regulator constitutes a control system which varies the welding variables of current and weld time depending on the process. The force signal, for example, serves as process guidance variable for the control.

In an operating mode with phase gating control or constant current regulation, the force quality factor can also, for example, be calculated and displayed only when a reference curve has previously been loaded for the weld program. The calculated force quality factor can be monitored for each spot weld in the welding system. Lower and upper intervention limits can be defined to this end by the user. When these limits are violated, this can be displayed in a user interface by means of an error message. The monitoring of the force quality factor can be integrated here in quality monitoring systems already present.

The process stability factor which can also be determined advantageously specifies the extent to which stability of a spot welding process corresponds to a reference weld. A process stability factor of 100% means that the process corresponds fully to the process of the reference weld, and therefore signals an unchanged stable welding process. For example, a process stability factor of 70% states that the welding process has changed by 30% in comparison with the reference weld.

The calculated process stability factor can be monitored for each spot weld in a welding device. The user can define lower intervention limits for this purpose. As also in the case of the force quality factor, when said limit is violated this can be displayed in the user interface by means of an error message. It is also possible to integrate the monitoring of the process stability factor in already present systems in this case.

The measures proposed by the disclosure yield an unfailingly good welding quality with stable spot diameters. Systematic errors in the production are uncovered and critical production facilities are recorded.

A computation unit, for example a welding controller, is set up, particularly in programming terms, for the purpose of carrying out the method.

It is also advantageous to implement the method in the form of software, for example in the form of a firmware of a welding controller, since this enables particularly low costs, in particular when an operating computation unit such as a welding controller is still being used for further tasks and is therefore present in any case. Suitable data carriers for providing the computer program are, in particular, diskettes, hard disks, flash memories, EEPROMs, CD-ROMs, DVDs and more besides. It is also possible to download a program via computer networks (Internet, intranet, etc.).

Further advantages and refinements of the disclosure follow from the description and the attached drawing.

It is self-evident that the abovenamed features and those still to be explained below can be used not only in the respectively specified combination, but also in other combinations or on their own without departing from the scope of the present disclosure.

BRIEF DESCRIPTION OF THE DRAWINGS

The disclosure is illustrated schematically in the drawings with the aid of an exemplary embodiment, and is described in detail below with reference to the drawings.

FIG. 4 shows a histogram of force quality factors which can be evaluated in accordance with an embodiment of the disclosure.

Mutually corresponding elements bear identical reference symbols in the figures, and are not repeatedly explained, for the sake of clarity.

DETAILED DESCRIPTION

Figure 1:
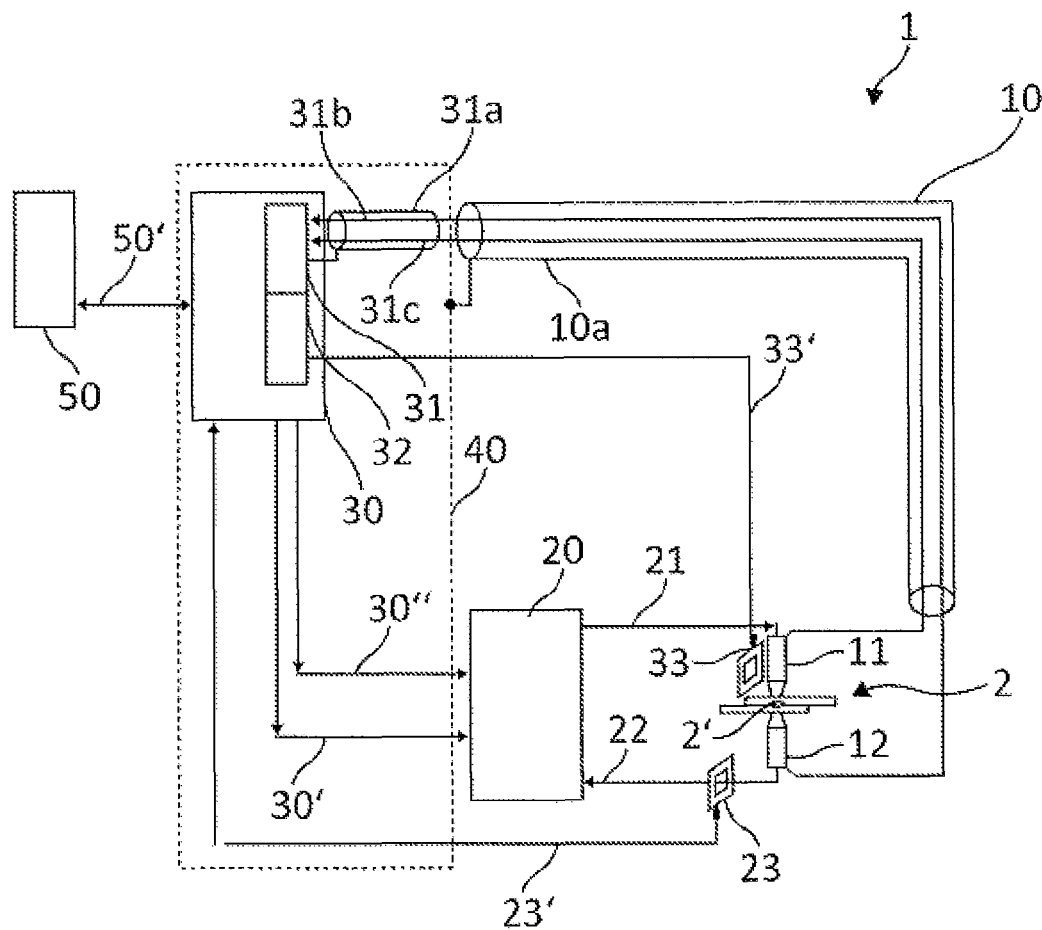
FIG. 1 shows a welding device which is set up to operate in accordance with an embodiment of the disclosure, in a schematic illustration.

FIG. 1 shows a welding device which is set up to operate in accordance with an embodiment of the disclosure, in a schematic illustration. Said device is denoted overall by 1.

The welding device 1 has an electrode holder 10 with a pair of electrodes 11 and 12. Provided in the electrode holder 10 is at least one line with a line screen 10a which is, for example, conductively connected to a housing 40 of a switching cabinet or welding case 40. A welding current illustrated by arrows 21 and 22 can be applied by means of a transformer 20 to the electrodes, which make contact with a workpiece 2, for example two aluminum sheets to be connected to one another at a spot weld 2'. The welding current 21, 22 can, for example, be provided as constant current by the transformer 20 in accordance with an appropriate regulation. A current sensor 23 can be provided for detecting the welding current.

A current value detected by means of the current sensor 23 can, for example, be fed to a welding controller 30 via a line 23'. The welding controller 30 can, for example, be arranged in the switching cabinet or welding case 40. The welding controller 30 can, for example, be an appropriately set-up welding controller 30 of the series PS 6000 of the applicant, which has an integrated power section. The method is described below with the aid of this welding controller 30, but can be implemented with any desired welding controllers 30 to the extent that the latter can be set up for operation according to the disclosure.

In addition to the components explained, welding devices 1 which are equipped with an appropriate welding controller 30 comprise at least one upstream drive control which controls the entire process on the workpiece 2 and also monitors it in terms of safety. This can be, for example, a programmable logic controller (SPS), a robot controller, a manual drive control (for example in the case of electrode holders 10 designed as hand pliers, or else a combination from said options. Here, a computer 50, for example a PC, is illustrated as upstream drive control. Said computer is attached via a line 50' and can, for example, also serve for determining a quality of a weld or corresponding quality factors in the way according to the disclosure.

Via lines 30' and 30", it is possible to apply to the transformer 20 drive signals which serve, for example, on the basis of defined weld programs to provide predetermined current blocks to the electrodes.

The welding controller 30 further comprises at least two input/output modules 31 and 32 which can be set up to drive the electrode holder and/or to receive corresponding signals. In the case of the above-explained welding controller 30 of the series PS 6000, said modules comprise, for example, the terminals X2 and X9 for pressure control and feedback in the form of five- or six-pole plug contacts. The latter can be parametrized if desired.

An input/output module 31 can, for example, provide an analog output signal which may be used to drive a proportional control valve with the aid of which it is possible to set a pressure force of the electrodes 11 and 12 exerted on the workpiece 2. A screen 31a is likewise attached to the input/output module 31.

Either the input/output module 31 or the input/output module 32 can be used for communicating to the welding controller 30 an actual force exerted at the electrodes 11, 12. In the present case, a corresponding feedback is shown via the lines 31b and 31c, on the one hand, and a line 33', on the other hand. At least the line 33' is connected to a corresponding force sensor 33.

Figure 2:
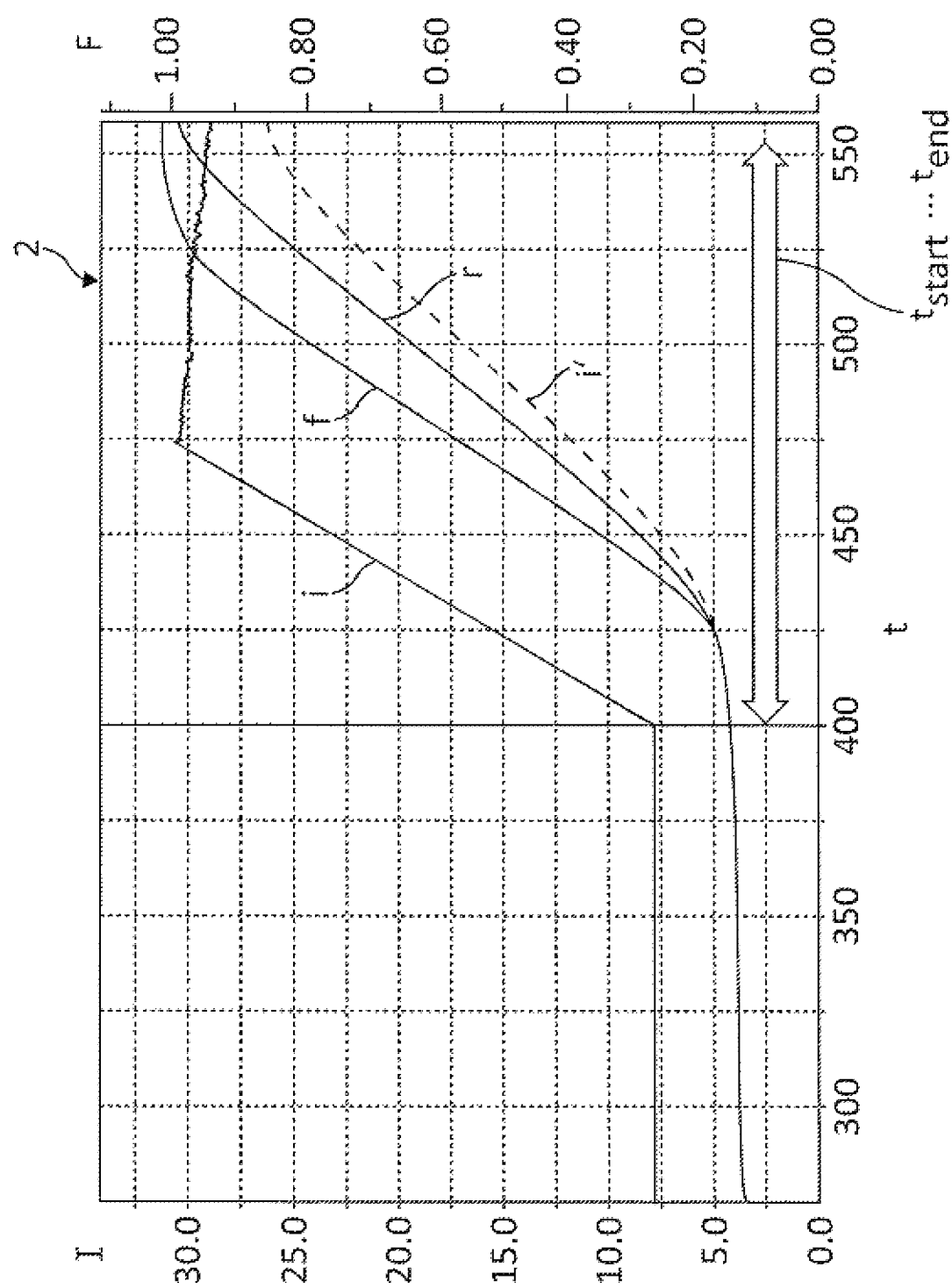
FIG. 2 shows current and weld force profiles which can be evaluated in accordance with an embodiment of the disclosure.

FIG. 2 shows current and weld force profiles which can be evaluated in accordance with an embodiment of the disclosure. Respectively plotted in the dimensionless, relative units in FIG. 2 on the ordinate against a weld time in t ms on the abscissa are a current profile i in kA, a force profile f determined during welding, and a reference force profile r. The specified units are merely exemplary here; it is also possible to use other units and/or values for aluminum welding and for determining a factor characterizing the quality.

Figure 3:
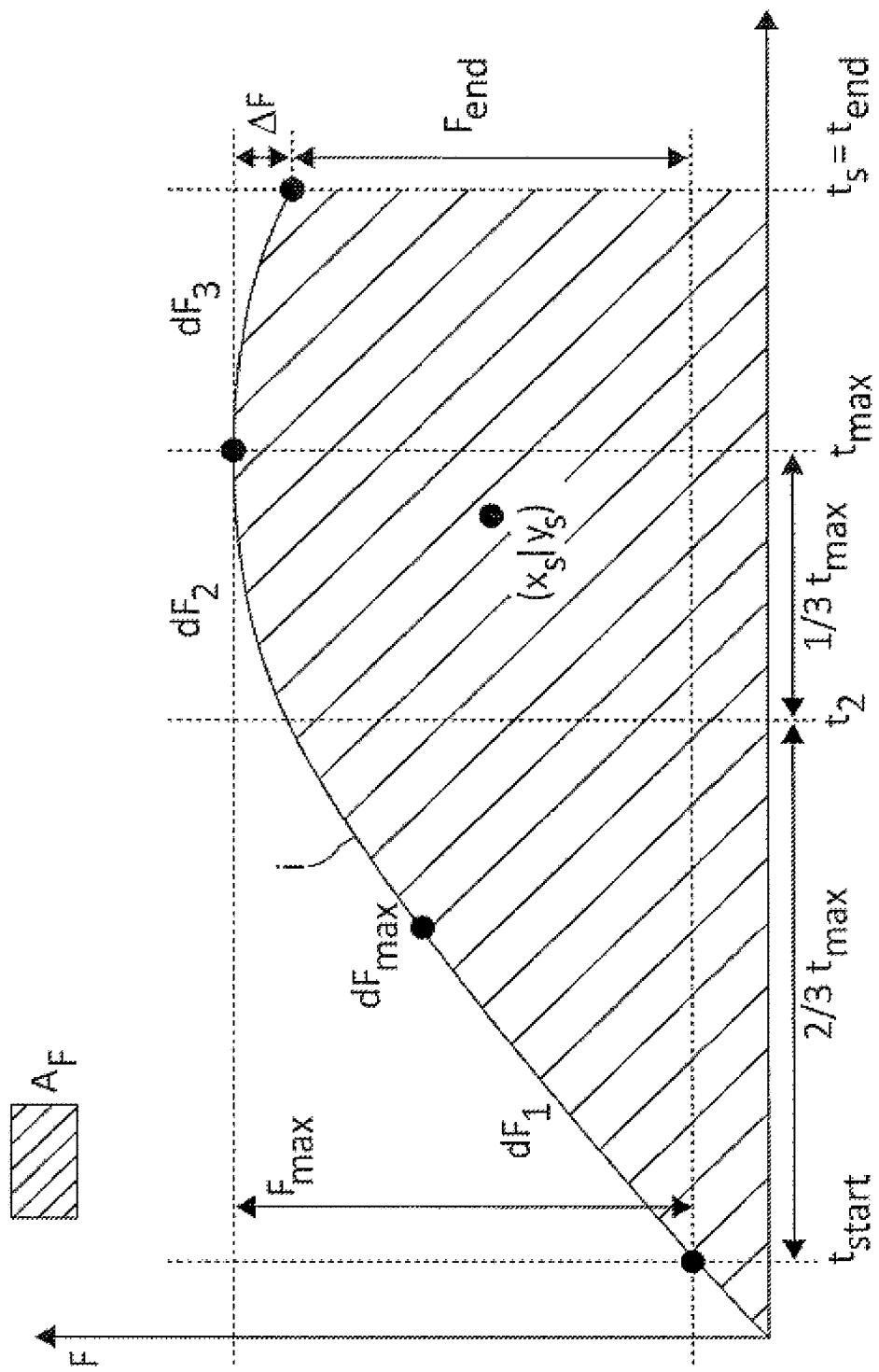
FIG. 3 illustrates features of a weld force curve of a weld force profile which can be evaluated in accordance with the disclosure.

The reference force profile r corresponds to the force profile of an exemplary weld; for example, it can constitute a desired value to be reached, or a (still) acceptable average or minimum quality. In FIG. 2, the weld force profile f lies above said reference force profile r. After appropriate evaluation, it is possible to derive herefrom that a corresponding weld has a better quality than that which is characterized by the reference force profile r. An appropriate determination is explained in more detail with reference to the following FIG. 3. A force profile i' likewise illustrated in FIG. 2 may, for example, correspond to a weld force profile which would not meet the quality requirements defined by the reference force profile r. A corresponding weld and/or a component produced hereby would therefore need to be rejected, for example.

As already explained previously, the illustrated current profile i is, for example, detected and/or varied depending on the process by means of an aluminum regulator ALR.

As already explained, at least one factor characterizing the quality can be determined on the basis of a comparison of the force detected as weld force profile f with the reference force profile r. This is explained with reference to FIG. 3, which illustrates in detail a corresponding weld force profile i during an evaluation time $t_{start} \ldots t_{end}$, denoted in FIG. 2 with a corresponding arrow. Reference may also be made regarding further details to the above table relating to the features of the weld force profile.

A corresponding consideration can be made, for example, also in a region between a measurement time start $t_{start}$ and a time $t_{max}$ at which the weld force profile i reaches its maximum value. The evaluation can also comprise only specific regions of such measurement times, for example a value of $\frac{2}{3} t_{max}$ or $\frac{1}{3} t_{max}$, that is to say between a time $t_{start}$ and a time $t_2$ and/or a time between $t_2$ and $t_{max}$. The evaluation can also take place within a total time from $t_{start}$ to $t_s = t_{end}$. By way of example, it is possible here to determine an area below the weld force curve i, illustrated by the hatching in FIG. 3 and denoted by $A_F$. If, for example, such an area $A_F$ is larger than that of a reference force profile r in a corresponding time, it is possible to assume a weld of qualitatively higher value than that which is defined by the reference force profile r.

For example, a corresponding area can be given a relative reference variable of 100 so that areas with a relative value greater than 100 specify a better welding quality, and areas with a relative value smaller than 100 specify a poorer welding quality. A corresponding statement also holds for the features $F_{max}$, which specifies a maximum change in weld force within the respective detection region. If this is above a a corresponding value of a reference force profile r, the welding quality is better, and in the other case worse than that of the reference force profile r. Further values that can be used are, for example, a gradient of the weld force profile curve $dF_1$, $dF_2$ or $dF_3$ during respective times of a corresponding weld force profile (see above table). Furthermore, it is, for example, also possible to determine a maximum gradient $dF_{max}$ of the weld force profile curve. A corresponding statement holds for a centroid $x_s/y_s$. Corresponding values can also be calculated with one another, and/or be used to define a dimensionless force quality factor by means of mathematical methods. If an appropriately determined value lies above a corresponding value of a reference force profile r, it is possible to assume a better weld, and in the other case the weld has quality defects.

An appropriate record of force and current profiles f, i can, for example, be prompted via a user interface on a computer 50. For this, by way of example, a mode of operation or a welding material (for example steel, aluminum or alloys) can be defined in such a user interface. A previously explained monitoring function can, for example, be defined for all weld programs or only for a portion thereof. Corresponding welding controllers 30, controller firmware and/or computer programs, running thereon, for evaluation on a computer 50 can be set up for monitoring a plurality of measured variables, for example up to ten measured variables. It is also possible to individually define measured variables for each weld program. In particular, the previously explained intervention limits for the force quality factor and/or the process stability factor can also be set in an appropriate computer program.

The recording of the weld force profile can, for example, comprise measuring a force signal via an analog interface during welding during each half-wave of, for example, 500 μs. The measured values can be scaled, averaged and stored in a welding controller 30 and/or a corresponding computer 50.

The calculated force quality factor can be compared with fixed intervention limits If it violates one of these limits, the system outputs an error message. By way of example, given permissible tolerances, one violation suffices here for the error state, while, given predetermined imposed limits, a defined number of violations are allowed to occur before the error message is triggered. If an error has occurred, the user must acknowledge said error, for example in a repeatedly explained user interface, before the controller can activate the next spot weld.

The calculation of the process stability factor can be done by analogy with the calculation of a known process stability factor for a steel weld. Instead of resistance as the measured variable known to be used there, in the case of aluminum as material it is possible to include the force signal in the calculation. For example, in this context it is possible to compare the measured values of a weld force profile and a reference force profile in a matrix of 1 ms. Each difference can lead to a reduction in the value for the process stability factor. The process stability factor can also be compared with appropriate intervention limits If it violates one of these limits, the system outputs an error message.

A data histogram can be used to analyze a quality of a weld program. All calculated values for the force quality factor and/or the process stability factor for each spot weld of a weld program can be stored in said histogram. An appropriate histogram is shown in FIG. 4 and denoted by 4. Force quality factors are plotted therein over a number n of spot welds. The force quality factor is an unsigned variable. Its value range lies between 0 as minimum value and 400 as maximum value.

A range between 50 and 200 is illustrated on the ordinate in FIG. 4, corresponding monitoring limits likewise being plotted, for example in the form of a first upper limiting value H and a second upper limiting value HH, and of a first lower limiting value L and a second lower limiting value LL. A sequence of spot welds of a specific weld program is illustrated on the abscissa in the diagram. Each point corresponds to a weld. By way of example, each point may be approached with a cursor C in an appropriate user interface, it being possible to output corresponding values at the respective point in the form of actual and desired values. The first upper limiting value H and the first lower limiting value L represent an imposed limit. By way of example, it is possible to specify for said limit how often it is allowed to be violated until an error is triggered. The second upper limiting value HH and the second lower limiting value LL constitute absolute limits. If said limits are violated, an error message is output immediately.

What is claimed is:

1. A method for determining a quality of at least one aluminum weld comprising:
    driving a proportional control valve with an electric output signal based on a desired force of at least one electrode exerted on a workpiece formed from aluminum;
    detecting an actual force exerted on the workpiece with the at least one electrode during aluminum welding using a force sensor as a weld force profile;
    determining and recording a weld force curve from the weld force profile;
    determining an area below the weld force curve; and
    determining at least one factor characterizing the quality of the at least one aluminum weld based on a comparison of the area below the weld force curve with at least one reference value based on the desired force.

2. The method according to claim 1, wherein the desired force is based on a previous force exerted on a previous workpiece by the at least one electrode during aluminum welding with a verified quality.

3. The method according to claim 1, further comprising:
    comparing the detected weld force profile with a reference force profile that includes a plurality of reference values.

4. The method according to claim 3, further comprising:
    comparing features of the weld force curve with features of a reference weld force curve determined from the reference force profile.

5. The method according to claim 4, wherein at least one of:
    (i) at least one gradient of at least one segment of the weld force curve or of the reference weld force curve is used as a feature of at least one of the weld force curve and the weld force reference curve,
    (ii) at least one maximum of the at least one segment of the weld force curve or of the weld force reference curve is used as the feature of at least one of the weld force curve and the reference weld force curve,
    (iii) at least one minimum of the at least one segment of the weld force curve or of the reference weld force curve is used as the feature of at least one of the weld force curve and the reference weld force curve,
    (iv) a difference between the at least one maximum and the at least one minimum of the at least one segment of the weld force curve or of the reference weld force curve is used as the feature of at least one of the weld force curve and the reference weld force curve,
    (v) at least one surface area of the at least one segment of the weld force curve or of the reference weld force curve is used as the feature of at least one of the weld force curve and the reference weld force curve, and
    (vi) at least one surface centroid of the at least one segment of the weld force curve or of the reference weld force curve is used as the feature of at least one of the weld force curve and the reference weld force curve.

6. The method according to claim 1, further comprising:
    determining a force quality factor as the factor characterizing the quality on the basis of the comparison.

7. The method according to claim 3, further comprising:
comparing values of the weld force profile at different instants with values of the reference force profile; and
determining a process stability factor in response to the comparison.

8. The method according to claim 1, further comprising:
prescribing at least one limiting value for the at least one factor characterizing the quality; and
introducing a quality assurance measure if the at least one factor characterizing the quality overshoots or undershoots the at least one limiting value.

9. The method according to claim 1, further comprising:
determining the quality of the at least one aluminum weld during an aluminum welding process.

10. The method according to claim 1, further comprising:
determining that a quality of the at least one aluminum weld exceeds a reference welding quality of an aluminum weld associated with the at least one reference value if the area below the weld force curve is greater than or equal to the at least one reference value integral;
determining that the quality of the at least one aluminum weld is less than the reference welding quality if the area below the weld force curve is less than the at least one reference value;
determining that a welding error has occurred if it is determined that the quality of the at least one aluminum weld is less than the reference welding quality; and
preventing additional aluminum welding until a controller determines that a user has acknowledged the welding error.

11. The method according to claim 1, further comprising:
determining that a welding error has occurred based on the at least one factor characterizing the quality; and
preventing additional aluminum welding until a controller determines that a user has acknowledged the welding error.

* * * * *